Nov. 7, 1961
R L BRAND
3,007,266
GRADER ATTACHMENT FOR A TRACTOR
Filed April 28, 1959
3 Sheets-Sheet 1
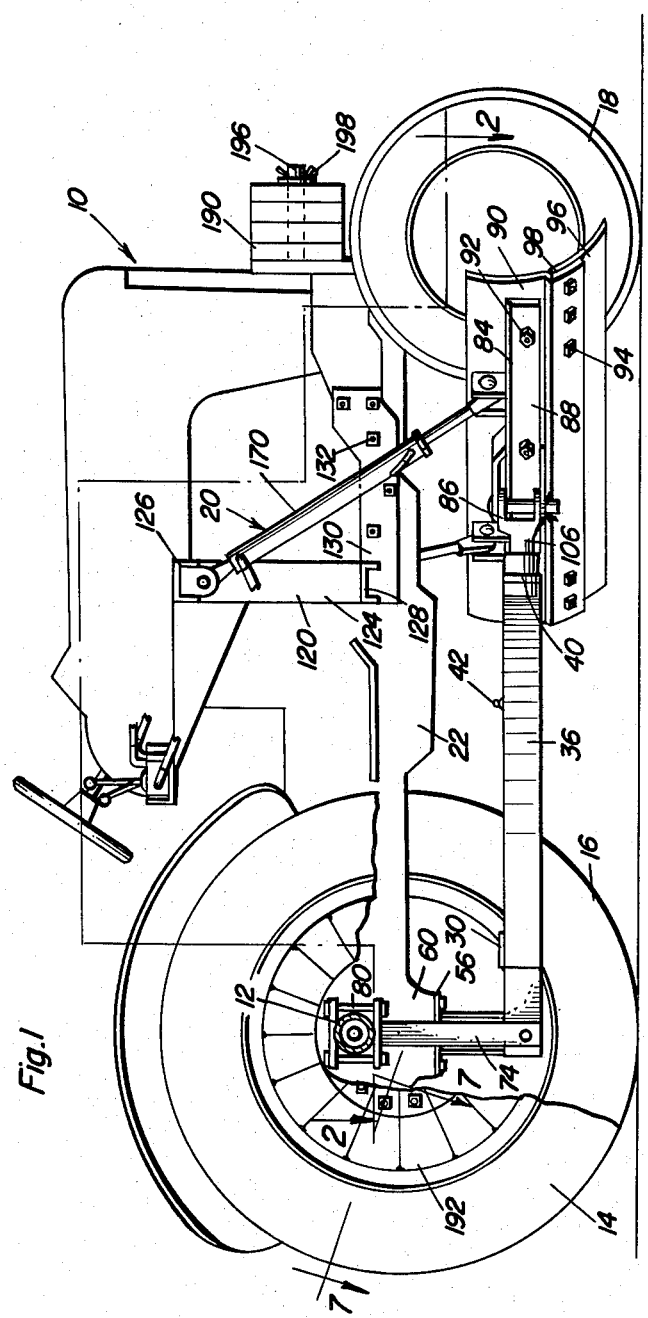
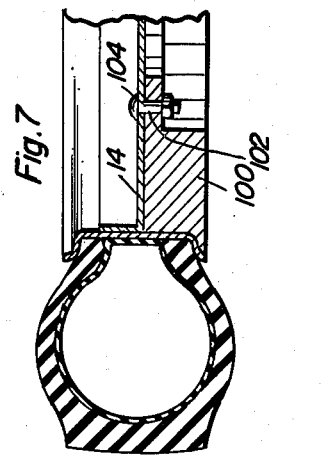
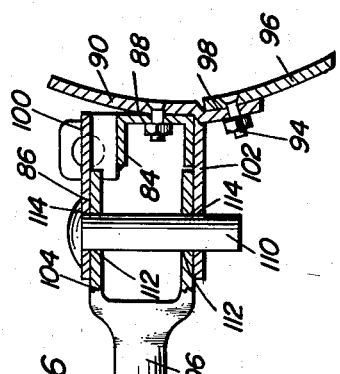
R L Brand
INVENTOR.

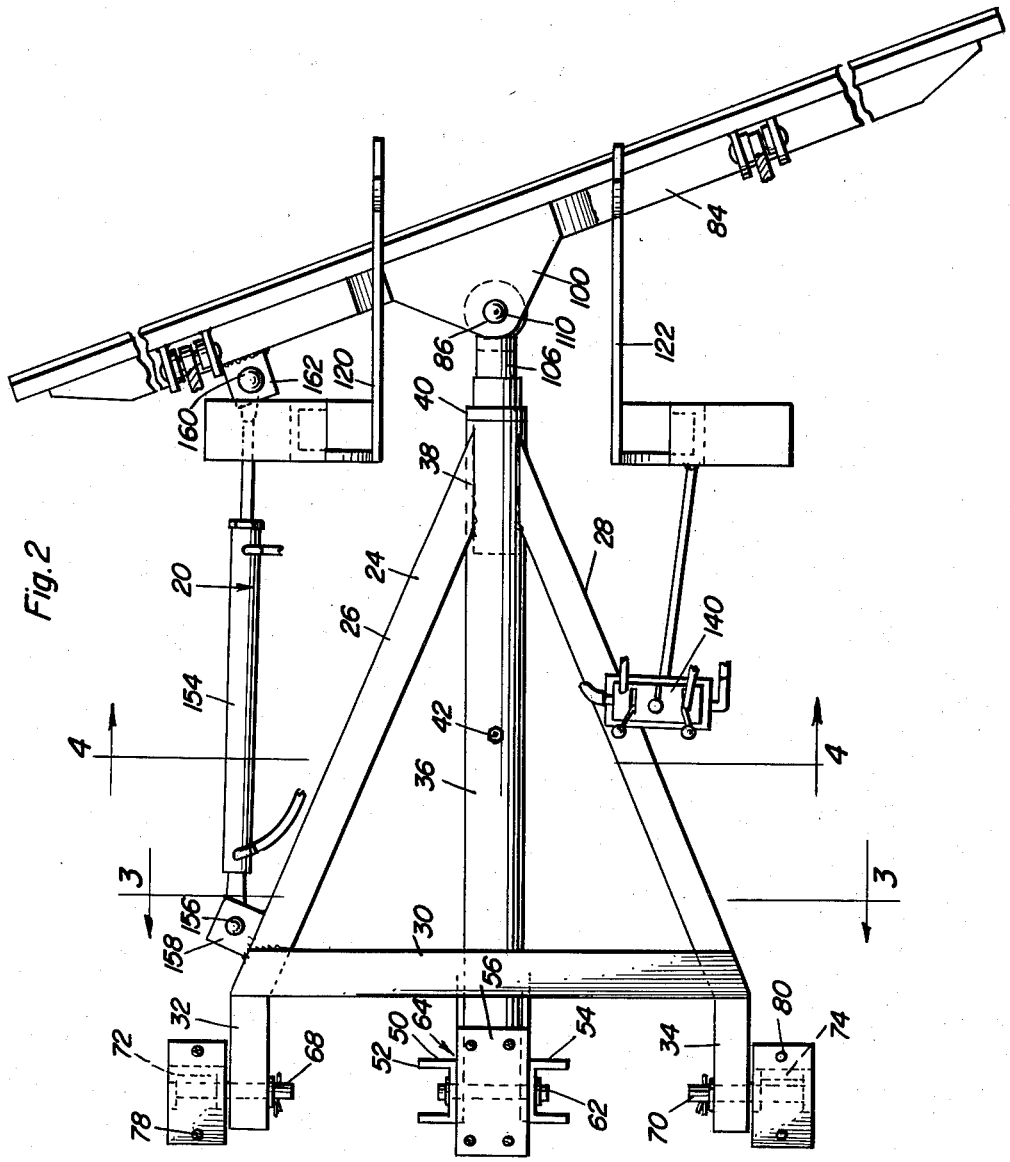

Nov. 7, 1961 R. L. BRAND 3,007,266
GRADER ATTACHMENT FOR A TRACTOR
Filed April 28, 1959 3 Sheets-Sheet 3
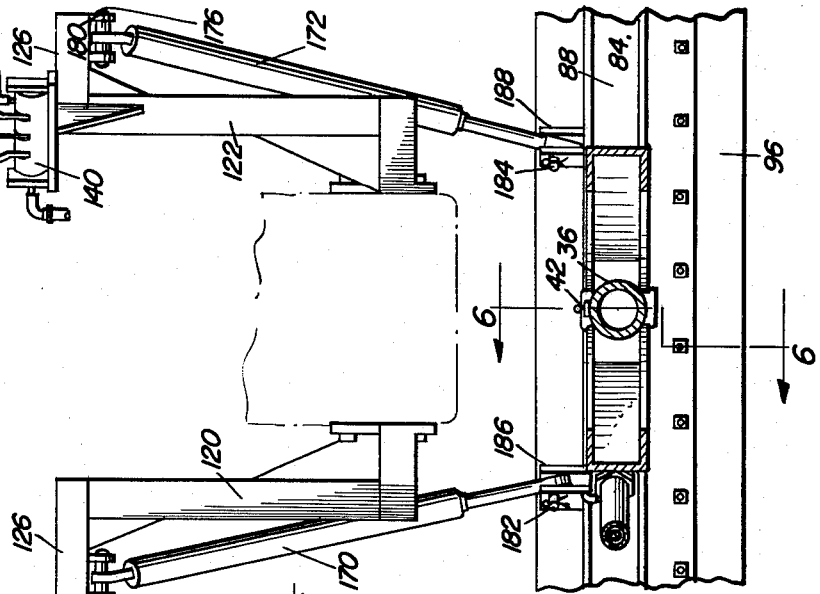
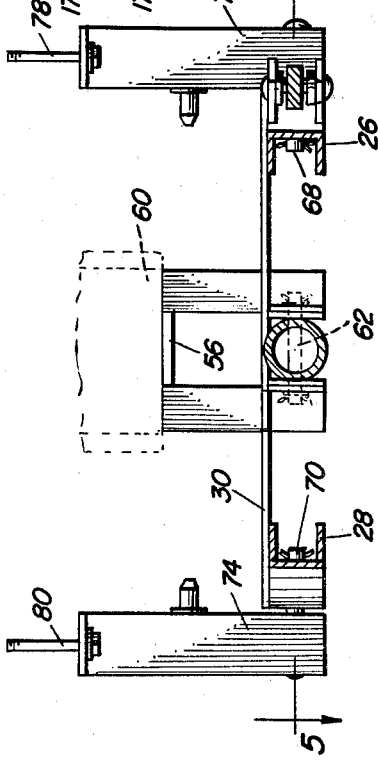
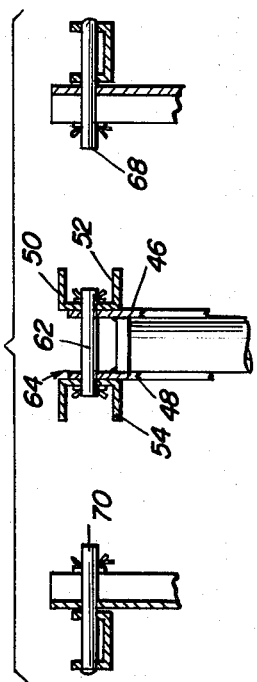
R L Brand
INVENTOR
BY
Attorneys

¹

United States Patent Office 3,007,266
Patented Nov. 7, 1961

3,007,266
GRADER ATTACHMENT FOR A TRACTOR
R L Brand, 218 Blackhawk Trail, San Antonio, Tex.
Filed Apr. 28, 1959, Ser. No. 809,469
8 Claims. (Cl. 37—155)

This invention relates to a grader attachment and more particularly to a grader attachment for a conventional tractor.

An object of the invention is to provide an attachment by which to perform grading operations with a conventional farm tractor.

Briefly, the attachment is constructed of a lower frame located beneath the undercarriage of a tractor and hinged at its rear end beneath the rear axle housing. The front end of the lower frame is capable of being raised and lowered in order to adjust the elevation of the grader blade and the grader blade support which is carried by the lower frame. The blade is disposed between the front and rear wheels of the tractor and is capable of adjustment about generally upright and generally horizontal axes in accordance with the desires of the user.

The attachment is of simple construction, being made of ordinary framing members so that the attachment may be constructed at a low unit cost and comparatively easily applied to an ordinary tractor employing the conventional hydraulic system of the tractor for obtaining necessary control of the grader blade.

Conventional tractors are not ordinarily heavy enough to perform normal grading operations. By having the grader blade located between the front and rear wheels of the tractor and by supplying additional weight to the tractor both in advance and behind the grader blade, the added weight may be maintained minimal, but the weight factor for grading is satisfied. Preferably, a group of weights or a single larger weight is located at the front of the tractor while the rear wheels of the tractor are directly weighted by the application of one more weights directly to the wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a tractor equipped with an attachment in accordance with the invention.

FIGURE 2 is a sectional view taken irregularly and approximately along the line 2—2 of FIGURE 1.

FIGURE 3 is a sectional view taken on the line 3—3 of FIGURE 2.

FIGURE 4 is a sectional view taken on the line 4—4 of FIGURE 2.

FIGURE 5 is a sectional view taken on the line 5—5 of FIGURE 3.

FIGURE 6 is an enlarged sectional view taken on the line 6—6 of FIGURE 4 and showing the universal joint coupling for attaching the grader blade support to the front end of the lower frame of the grader attachment.

FIGURE 7 is an enlarged sectional view taken on the line 7—7 of FIGURE 1 and showing principally the way that it is preferred to weight the rear end of the tractor by applying weights directly to the tractor rear wheels.

In the accompanying drawings there is shown a conventional tractor 10 equipped with all of the conventional parts including rear axle housing 12 at the ends of which there are rear wheels 14 and 16. Front wheels 18 are attached in the usual way to the tractor front end. The conventional hydraulic system of the tractor is used for powering the various extensible fluid motors of attachment 20 which is located principally beneath the undercarriage 22 of the tractor 10.

Attachment 20 is constructed of a lower frame 24 having a pair of side frame members 26 and 28 spaced apart at their rear ends by means of a transverse brace 30. The rear extremities of members 26 and 28 have parallel portions 32 and 34, and the front converging ends of the frame members are secured to a tube 36, for instance by welds 38. The front end of the tube 36 is equipped with a bushing or sleeve bearing 40, and there is a grease fitting 42 inteemediate the ends of the tube to supply grease to the interior of the hollow tube. The rear end of tube 36 has a pair of ears 46 and 48 welded or otherwise secured thereto, and these are connected to an upstanding push bar bracket 50 made by a pair of parallel channels or hangers 52 and 54 that are welded or otherwise secured to the differential access plate 56. Ears 46 and 48 fit between channels 52 and 54, and the plate 56 is, as usual, bolted to the bottom of the differential case or housing 60 from which the axle housings 12 protrude laterally. Horizontal pivot pin 62 extends through aligned openings in ears 46 and 48 and in the channels 52 and 54 thereby completing a bracket assembly 64 by which the rear end of tube 36 is hingedly attached to the tractor.

The portions 32 and 34 of frame members 26 and 28 are each similarly attached to axle housing 12. Horizontal pivot pins or hinge pins 68 and 70 extend through aligned openings in portions 32 and 34, and the hinge pins 68 and 70 are coaxial with hinge pin 62. Hangers 72 and 74 are connected by hinge pins 68 and 70 to the frame members 26 and 28, and the upper ends of the hangers are attached to the axle housing by means of clamps 78 and 80 or equivalent fastening means. It is preferred that the frame members 26 and 28 be made of a channel section for strength and rigidity of construction. The hangers and hinge pins 68 and 70 form a pair of bracket assemblies and cooperate with bracket assembly 64 to hingedly connect the rear end of the lower frame 24 to the rear undercarriage portion of tractor 10.

Grader blade support 84 is connected by a universal joint 86 to the front end of lower frame 24. The grader blade support 84 is composed of a channel 88 with a moldboard 90 bolted by bolts 92 thereto. Bolts 94 connect blade 96 to the longitudinal offset portion 98 of moldboard 90. Universal joint 86 is made of upper and lower plates 100 and 102 each of which is welded to channel 88. The upper and lower plates 100 and 102 are spaced from each other to receive fork 104 which is at the forward end of a spindle 106. The spindle is mounted for rotation in bushing 40 and is connected to the upper and lower plates 100 and 102 by means of a pin 110. The pin is passed through aligned apertures 112 in fork 104 and aligned apertures 114 in the upper and lower plates 100 and 102. The rotational movement of spindle 106 and consequently of moldboard support 84 is about an axis extending generally lengthwise of the tractor 10. The rotational movement of the support 84 about the longitudinal axis of pin 110 is about a generally upright axis.

A pair of essentially identical side frames 120 and 122 (FIGURE 4) are bolted to the sides of the tractor. Side frame 120 consists of an upright 124 having a lateral hanger 126 at its upper end, together with an inwardly extending bracket 128 at its lower end. The bracket is made integral or otherwise fixed to mounting plate 130 having a series of openings by which to accommodate bolts 132. The bolts are used to fasten mounting plate 130 to the side of tractor 10. Side frame 122 differs from side frame 120 only in that it is the right hand bracket instead of the left hand bracket, and it is equipped with a control valve assembly 140 which operatively connects with each of the extensible fluid motors and the tractor hydraulic power system. Control 140 is composed of conventional valves which are commercially available and commonly known. The extensible fluid motors are each of the same type. There is a double-acting hydraulic cylinder 154 (FIGURE 2) connected at one end by means of a pivot 156 to a laterally projecting ear 158 on the rear part of the lower frame 24. The front end of the double-acting hydraulic cylinder is connected by pin 160 to an ear 162 that protrudes rearwardly from channel 88. There is a requisite amount of lost motion between the hinge pins or pivot pins and the openings in the pertinent parts of the double-acting hydraulic cylinder to permit operation. When the extensible hydraulic cylinder 154 is extended and retracted in accordance with operation of the proper control valve at control 140, the blade support 84 is adjusted by pivotal movement about the axis of pin 110 of the universal joint 86. Although the hinge pin may be vertical in some operation positions, the axis of the hinge pin is not always vertical but is ordinarily generally upright.

A pair of extensible fluid motors, for example double-acting hydraulic cylinders 170 and 172 are hingedly connected by pivot pins 174 and 176 to pairs of mounting ears 178 and 180 which are fixed to and depend from the laterally extending hangers 126 of the side frames. The lower ends of the double-acting cylinders 170 and 172 are connected by pivot or hinge pins 182 and 184 to pairs of mounting ears 186 and 188 which are fixed, as by welding, to the upper surface of channel 88. The points of connection of the lower ends of the hydraulic cylinders 170 and 172 to the channel 88 are on opposite sides of the universal joint 86. Accordingly, if both hydraulic cylinders 170 and 172 are simultaneously operated the entire frame, including the blade support, is elevated with the hinged movement of the frame being about a single longitudinal axis passing through the three pins 70, 62 and 68. However, if the hydraulic cylinders 170 and 172 are independently operated or if one is actuated farther than the other, there will be a tilting movement of the support 84 occasioned by rotation of spindle 106 in its bushing 40. The axis of rotation will be in a general direction lengthwise of the tractor 10.

A group of weights 190 are provided at the front of the tractor and a group of weights 192 on each rear wheel 14 and 16. Weights 190 may be substituted by a single weight, but in either case it is preferred that the weights be supported by a single arm 196 attached to the tractor frame in the front thereof and approximately over the front wheels 18 of the tractor. The weights may be held in place by a cotter pin 198 or some other type of key in or attached to arm 196. The rear weights 192 are attached directly to the wheels and each consists of a trapezoidal weight 100 having a hole 102 therein by which bolt 104 may attach the weight to the front face of one of the wheels. In this way all of the weights may be arranged in a circle on the rear wheels and any number of weights may be applied thereto within the capacity of the wheel as to space and capability of supporting the weights. This places the additional weight directly over the axis of rotation of the rear wheels. Further, the weight distribution of the tractor is enhanced insofar as grading operations are concerned because some weights are directly over the front wheels or essentially so, and directly over the axis of rotation of the rear wheels, with the grader blade operating in between the front and rear wheels of the tractor.

The use and operation of the grader attachment has been described along with the description of the structure thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a conventional tractor including a frame and a rear axle housing having a differential case intermediate the ends thereof and including a bottom access plate, and a grader attachment comprising bracket means secured to and depending from said access plate, a transverse pivot pin provided in said bracket means, a grader frame including a tube disposed longitudinally under the tractor frame and mounted at its rear end on said pivot pin for raising and lowering movement, a shaft coaxial with and rotatably journalled in the front end portion of said tube, a fork provided on said shaft, a substantially upright pivot pin provided in said fork, a blade support mounted on said substantially upright pivot pin for lateral swinging movement, a grader blade carried by said blade support, power means for swinging the blade support, and power means on the sides of the tractor frame for raising and lowering said grader frame.

2. The combination as defined in claim 1 wherein said grader frame also includes a pair of rearwardly divergent side members secured at their front ends to the front end portion of said tube in coplanar relation therewith, a cross member secured to the rear end portion of the tube and to the rear ends of said side members, and a pair of parallel extensions projecting rearwardly from the ends of said cross member, together with bracket means provided on and depending from the end portions of said rear axle housing, and pivots connecting said extensions to said last mentioned bracket means coaxially with said pivot pin.

3. The combination as defined in claim 1, wherein the last-named means comprises a pair of brackets secured to opposite sides of said tractor frame rearwardly of said grader blade, a pair of extensible power operators pivoted at one end thereof to the respective brackets and extending downwardly and forwardly therefrom, the lower ends of said power operators being pivoted to said blade support at opposite sides of said substantially upright pivot pin.

4. The combination as defined in claim 1 wherein said means for swinging said blade support comprises an extensible power operator pivoted at one end thereof to one side of said grader frame and pivoted at its other end to said blade support at one side of said substantially upright pivot pin.

5. The combination of a tractor including a pair of axle housings and a differential case therebetween, said case including a bottom access plate, and a grader attachment comprising a pair of hangers depending from the plate, hangers depending from the axle housings, a generally A-shaped frame pivotally mounted on the second-named hangers and extending forwardly therefrom for vertical swinging movement beneath the tractor, a cylindrical tube mounted longitudinally in the frame and having its rear end portions pivotally secured between said pair of hangers, said frame including a pair of forwardly convergent side bars having their forward end portions affixed to the forward end portion of the tube on the opposite sides thereof, said side bars including parallel rear end portions pivotally secured to said second named hangers, said frame further including a cross bar affixed to the rear portions of the side bars and the tube, a shaft journaled in the front end portion of the tube and extending forwardly therefrom, a fork on the forward end of said shaft, a grader blade, a channel bar mounted longitudinally on the back of said blade, vertically spaced, rearwardly projecting plates on said channel bar receiving the fork therebetween, a vertical pivot pin connecting the plates to the fork for mounting the blade for horizontal swinging adjustment on the shaft and for rotary adjustment therewith, means for adjusting the blade horizontally, and means for rotatably and vertically adjusting said blade.

6. The combination of a tractor including a pair of axle housings and a differential case therebetween, said case including a bottom access plate, and a grader attachment comprising a pair of hangers depending from the plate, hangers depending from the axle housings, a generally A-shaped frame pivotally mounted on the second-named hangers and extending forwardly therefrom for vertical swinging movement beneath the tractor, a cylindrical tube mounted longitudinally in the frame and having its rear end portion pivotally secured between said pair of hangers, said frame including a pair of forwardly convergent side bars having their forward end portions affixed to the forward end portion of the tube on the opposite sides thereof, said side bars including parallel rear end portions pivotally secured to said second-named hangers, said frame further including a crossbar affixed to the rear portions of the side bars and the tube, a shaft journaled in the front end portion of the tube and extending forwardly therefrom, a fork on the forward end of said shaft, a grader blade, a channel bar mounted longitudinally on the back of said blade, vertically spaced, rearwardly projecting plates on said channel bar receiving the fork therebetween, a vertical pivot pin connecting the plates to the fork for mounting the blade for horizontal swinging adjustment on the shaft and for rotary adjustment therewith, means for adjusting the blades horizontally, and means for rotatably and vertically adjusting said blade, the tractor further including a hydraulic system, the last-named means including a pair of brackets mounted on the sides of the tractor rearwardly of the blade, forwardly and downwardly inclined hydraulic engines pivotally suspended from said brackets and operatively connected to the channel bar on opposite sides of the pivot pin, and means comprising a control valve unit on one of the brackets operatively connecting the engines to the hydraulic system.

7. The combination of a tractor including a pair of axle housings and a differential case therebetween, said case including a bottom access plate, and a grader attachment comprising a pair of hangers depending from the plate, hangers depending from the axle housings, a generally A-shaped frame pivotally mounted on the second-named hangers and extending forwardly therefrom for vertical swinging movement beneath the tractor, a cylindrical tube mounted longitudinally in the frame and having its rear end portion pivotally secured between said pair of hangers, said frame including a pair of forwardly convergent side bars having their forward end portions affixed to the forward end portion of the tube on the opposite sides thereof, said side bars including parallel rear end portions pivotally secured to said second-named hangers, said frame further including a crossbar affixed to the rear portions of the side bars and the tube, a shaft journaled in the front end portion of the tube and extending forwardly therefrom, a fork on the forward end of said shaft, a grader blade, a channel bar mounted longitudinally on the back of said blade, vertically spaced, rearwardly projecting plates on said channel bar receiving the fork therebetween, a vertical pivot pin connecting the plates to the fork for mounting the blade for horizontal swinging adjustment on the shaft and for rotary adjustment therewith, means for adjusting the blade horizontally, and means for rotatably and vertically adjusting said blade, the tractor further including a hydraulic system, the first-named means comprising a hydraulic engine pivotally mounted on one of the side bars and operatively connected to the channel bar on one side of the pivot pin, and means comprising a control valve unit operatively connecting said engine to the hydraulic system for actuation thereby.

8. The combination of a tractor including a pair of axle housings and a differential case therebetween, said case including a bottom access plate, and a grader attachment comprising a pair of hangers depending from the plate, hangers depending from the axle housings, a generally A-shaped frame pivotally mounted on the second-named hangers and extending forwardly therefrom for vertical swinging movement beneath the tractor, a cylindrical tube mounted longitudinally in the frame and having its rear end portion pivotally secured between said pair of hangers, said frame including a pair of forwardly convergent side bars having their forward end portions affixed to the forward end portion of the tube on the opposite sides thereof, said side bars including parallel rear end portions pivotally secured to said second named hangers, said frame further including a cross bar affixed to the rear portions of the side bars and the tube, a shaft journaled in the front end portion of the tube and extending forwardly therefrom, a fork on the forward end of said shaft, a grader blade, a channel bar mounted longitudinally on the back of said blade, vertically spaced, rearwardly projecting plates on said channel bar receiving the fork therebetween, a vertical pivot pin connecting the plates to the fork for mounting the blade for horizontal swinging adjustment on the shaft and for rotary adjustment therewith, means for adjusting the blade horizontally, and means for rotatably and vertically adjusting said blade, the tractor further including a hydraulic system, the first-named means comprising a hydraulic engine pivotally mounted on one of the side bars and operatively connected to the hydraulic system and to the channel bar on one side of the pivot, the second-named means including a pair of upstanding, angular brackets mounted on the sides of the tractor rearwardly of the blade, a pair of forwardly and downwardly inclined hydraulic engines pivotally suspended from said brackets and operatively connected to the hydraulic system and to the channel bar on opposite sides of the pivot pin, and a control valve unit on one of the brackets interposed between the hydraulic system and the engines.

References Cited in the file of this patent

UNITED STATES PATENTS

| | | |
|---|---|---|
| 2,238,389 | Kerber | Apr. 15, 1941 |
| 2,281,360 | Kerber | Apr. 28, 1942 |
| 2,307,655 | Arps | Jan. 5, 1943 |
| 2,633,066 | Hester | Dec. 2, 1948 |
| 2,614,345 | Lay | Oct. 21, 1952 |
| 2,701,728 | Miller | Feb. 8, 1955 |
| 2,798,738 | Darby | July 9, 1957 |

FOREIGN PATENTS

| | | |
|---|---|---|
| 115,429 | Australia | June 25, 1942 |
| 138,511 | Australia | Aug. 28, 1950 |